Patented Mar. 27, 1951

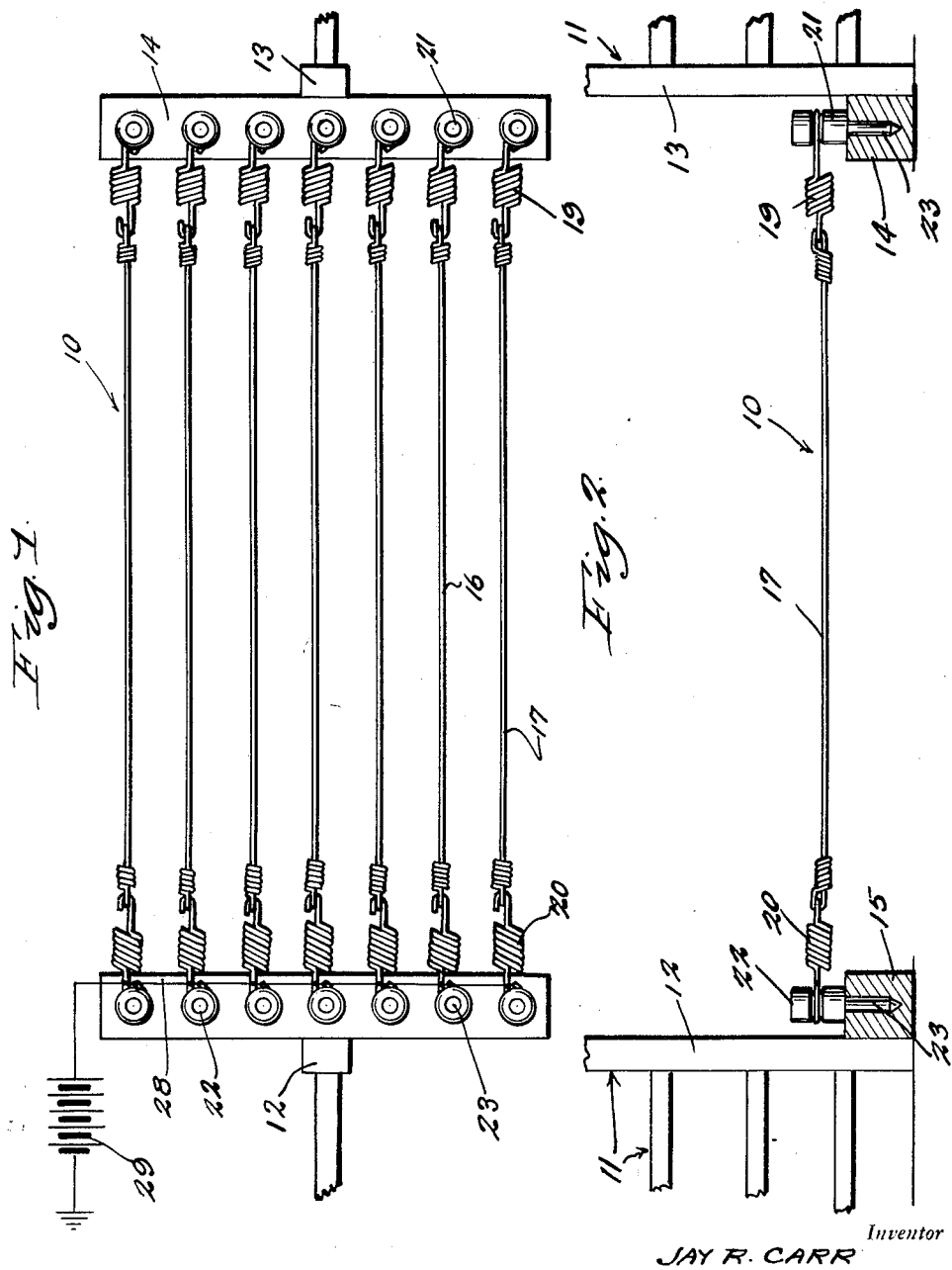

2,546,429

UNITED STATES PATENT OFFICE 2,546,429

ELECTRIFIED GATE

Jay R. Carr, White River, S. Dak.

Application November 7, 1945, Serial No. 627,158

1 Claim. (Cl. 256—10)

My invention as described herein, and illustrated in the accompanying drawings, consists of a horizontally disposed gate, an object of which is to provide a gateway for electric fences over which trucks may drive, but over which stock will not attempt to walk.

Another object of my invention is to provide a gate formed of a series of electrified wires.

A further object of this invention is to provide a gate consisting of a series of spring held wires.

Other features and advantages will become more readily apparent from the following description and the accompanying illustrative drawings in which:

Figure 1 is a plan view of my gate, and

Figure 2 is an end view thereof.

In the accompanying drawings, and in the following specification, the same reference characters are used to designate the same parts and elements throughout and in which 10 refers to my invention in its entirety and 11 indicates a fence and between the spaced posts 12 and 13 thereof is the gate 10, which consists of a pair of spaced apart bars 14 and 15, which may be of angle iron or of wood. To the said bars are connected a series of spaced apart wires 16, 17, by means of coil springs 19 and 20, which in turn are fastened to the pins 21 and 22, which may be insulators secured by nails 23 to the members 14 and 15, if of wood. The posts 12 and 13, may be of metal or wood.

If wood bars 14 and 15 are used, the wires 16, are all connected by a wire 28, with a source of suitable electrical energy 29.

From the foregoing it will be seen that I have provided a gate adapted to be supported horizontally about six inches above the ground and over which a truck may ride without injury to the gate as the wires 16 and 17, are depressible under the weight of the truck wheels and immediately spring back into raised position. Of course the gate may be made as long and as wide as conditions require. Stock animals will not attempt to pass over the gate since as soon as the leg of an animal touches one of the wires, it will receive a shock which will make the animal jump back.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described my invention that which I claim as new and desire to procure by Letters Patent is:

An electrified cattle guard comprising a pair of bars of electrically non-conductive material anchored in opposing parallel relation at the sides of a roadbed, opposing pairs of coiled springs mounted on said bars, a plurality of metal wires stretched between and conductively connected to opposing pairs of said springs and extending transversely of the roadbed above the level thereof, and a suitable source of electricity connected to said springs on one of said bars and grounded so that an animal on the roadbed touching any one of said wires will complete the electrical circuit through a portion of the animal's body.

JAY R. CARR.

REFERENCES CITED

The following references are of record in the file of this patent:

UNITED STATES PATENTS

| Number | Name | Date |
| --- | --- | --- |
| 279,322 | Brainerd | June 12, 1883 |
| 294,106 | Baker | Feb. 26, 1884 |
| 421,677 | Cunningham | Feb. 18, 1890 |
| 520,510 | Wilson | May 29, 1894 |
| 699,925 | Meador | May 13, 1902 |
| 714,940 | McMannama et al. | Dec. 2, 1902 |
| 1,354,405 | King | Sept. 28, 1920 |
| 1,740,107 | Lewis | Dec. 17, 1929 |
| 1,757,024 | Solis | May 6, 1930 |
| 2,010,603 | McClintock | Aug. 6, 1935 |
| 2,023,835 | Heiken | Dec. 10, 1935 |
| 2,512,740 | Evans | June 27, 1950 |

FOREIGN PATENTS

| Number | Country | Date |
| --- | --- | --- |
| 423,705 | France | Feb. 23, 1911 |